United States Patent
Wissmann et al.

(10) Patent No.: US 12,498,388 B2
(45) Date of Patent: Dec. 16, 2025

(54) METHODS AND APPARATUS FOR IMAGING SPECIMENS AND/OR SAMPLE CONTAINERS

(71) Applicant: Siemens Healthcare Diagnostics Inc., Tarrytown, NY (US)

(72) Inventors: Patrick Wissmann, Munich (DE); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 614 days.

(21) Appl. No.: 16/635,535

(22) PCT Filed: Jul. 25, 2018

(86) PCT No.: PCT/US2018/043755
§ 371 (c)(1),
(2) Date: Jan. 30, 2020

(87) PCT Pub. No.: WO2019/027769
PCT Pub. Date: Feb. 7, 2019

(65) Prior Publication Data
US 2020/0256884 A1    Aug. 13, 2020

Related U.S. Application Data

(60) Provisional application No. 62/538,927, filed on Jul. 31, 2017.

(51) Int. Cl.
*G01N 35/04* (2006.01)
*G01N 21/15* (2006.01)
(Continued)

(52) U.S. Cl.
CPC ............. *G01N 35/04* (2013.01); *G01N 21/15* (2013.01); *G01N 2021/6482* (2013.01); *G01N 2035/00752* (2013.01)

(58) Field of Classification Search
CPC .................. G01N 35/04; G01N 21/15; G01N 2021/6482; G01N 2035/00752;
(Continued)

(56) References Cited

U.S. PATENT DOCUMENTS

| 5,089,229 A | 2/1992 | Heidt et al. |
| 6,353,471 B1 | 3/2002 | Samsoondar et al. |

(Continued)

FOREIGN PATENT DOCUMENTS

| CN | 2576233 Y | 10/2003 |
| CN | 106900274 A | 6/2017 |

(Continued)

OTHER PUBLICATIONS

PCT International Search Report and Written Opinion dated Oct. 24, 2018 (9 Pages).

(Continued)

*Primary Examiner* — Elizabeth A Robinson
*Assistant Examiner* — Sophia Y Lyle (57) ABSTRACT

A method of imaging a sample container and/or a specimen in a sample container. The method includes enclosing at least a portion of a sample container with a moveable hood, the moveable hood having a wall with one or more openings extending between an interior of the moveable hood and an exterior of the moveable hood. Image data of the sample container is generated using one or more imaging devices positioned exterior to the moveable hood. The one or more imaging devices have a line of sight to the sample container through the one or more openings. Automated specimen testing systems, optical characterization apparatus, and methods of measuring characteristics of sample containers are provided, as are other aspects.

11 Claims, 7 Drawing Sheets

(51) Int. Cl.
*G01N 35/00* (2006.01)
*G01N 21/64* (2006.01)

(58) Field of Classification Search
CPC ............. G01N 35/00732; G01N 21/51; G01N 2201/064; G01N 21/253; G01N 21/255; G01N 21/31; G01N 2035/0403; G01N 2035/0406; G01N 2035/0456; G01N 2035/046; G01N 2035/0429; G01N 2035/0432; G01N 2035/0401; G01N 2035/0474
See application file for complete search history.

(56) References Cited

U.S. PATENT DOCUMENTS

| | | | |
|---|---|---|---|
| 6,930,774 B1 * | 8/2005 | Morrison | G01J 3/10 356/310 |
| 7,422,693 B2 | 9/2008 | Carter et al. | |
| 7,663,738 B2 | 2/2010 | Johansson | |
| 7,760,340 B2 | 7/2010 | Hoshiko et al. | |
| 7,771,659 B2 | 8/2010 | Ziegler | |
| 7,854,891 B2 | 12/2010 | Yamamoto et al. | |
| 7,982,201 B2 | 7/2011 | Bryant et al. | |
| 8,064,061 B2 | 11/2011 | Yamamoto et al. | |
| 8,194,235 B2 | 6/2012 | Kosaka et al. | |
| 8,380,444 B2 | 2/2013 | Kim et al. | |
| 8,381,581 B2 | 2/2013 | Walsh et al. | |
| 8,545,760 B2 | 10/2013 | Yamamoto et al. | |
| 8,859,289 B2 | 10/2014 | Marty et al. | |
| 2001/0004285 A1 | 6/2001 | Cadell et al. | |
| 2004/0168919 A1 | 9/2004 | Kurt et al. | |
| 2004/0202577 A1 * | 10/2004 | McNeil | G01N 33/5302 422/82.08 |
| 2005/0163354 A1 | 7/2005 | Ziegler | |
| 2006/0250517 A1 | 11/2006 | Nilson et al. | |
| 2007/0178009 A1 * | 8/2007 | Sakaino | A61B 5/150274 422/400 |
| 2011/0267450 A1 | 11/2011 | Pronkine | |
| 2012/0140230 A1 | 6/2012 | Miller | |
| 2013/0076882 A1 | 3/2013 | Itoh | |
| 2013/0240754 A1 * | 9/2013 | Iguchi | G01N 21/645 250/228 |
| 2014/0202829 A1 * | 7/2014 | Eberhardt | B65G 35/00 198/339.1 |
| 2014/0293036 A1 | 10/2014 | Ddecaux et al. | |
| 2015/0226759 A1 | 8/2015 | Connolly et al. | |
| 2015/0260648 A1 * | 9/2015 | Xu | G01N 21/59 250/206 |
| 2018/0372648 A1 | 12/2018 | Wissmann et al. | |
| 2018/0372715 A1 | 12/2018 | Kluckner et al. | |
| 2019/0041318 A1 | 2/2019 | Wissmann et al. | |
| 2020/0151878 A1 | 5/2020 | Kluckner et al. | |
| 2020/0166405 A1 | 5/2020 | Wissmann et al. | |
| 2020/0166531 A1 | 5/2020 | Wissmann et al. | |
| 2020/0191714 A1 | 6/2020 | Wissmann et al. | |

FOREIGN PATENT DOCUMENTS

| | | | |
|---|---|---|---|
| DE | 102013210269 B3 | 11/2014 | |
| EP | 1186893 B1 | 1/2008 | |
| EP | 1967840 A2 | 9/2008 | |
| EP | 3 203 216 A1 | 8/2017 | |
| JP | H02-116742 A | 5/1990 | |
| JP | H07-083831 A | 3/1995 | |
| JP | 2002-357560 A | 12/2002 | |
| JP | 2004-534954 A | 11/2004 | |
| JP | 2006-515428 A | 5/2006 | |
| WO | 0036400 A1 | 6/2000 | |
| WO | 2012/073568 A1 | 6/2012 | |
| WO | WO-2015056649 A1 * | 4/2015 | ........... G01F 23/263 |
| WO | 2016/052704 A1 | 4/2016 | |
| WO | 2016/133900 A1 | 8/2016 | |

OTHER PUBLICATIONS

Extended EP Search Report dated Jun. 17, 2020 of corresponding European Application No. 18840821.5, 4 Pages.

* cited by examiner

METHODS AND APPARATUS FOR IMAGING SPECIMENS AND/OR SAMPLE CONTAINERS

CROSS-REFERENCE TO RELATED APPLICATIONS

This application claims priority to U.S. provisional application Ser. No. 62/538,927 filed on Jul. 31, 2017, the contents of which is incorporated herein by reference in its entirety.

FIELD

The present disclosure relates to methods and apparatus for imaging a specimen container and/or its contents.

BACKGROUND

A wide variety of automated chemical analyzers are used to analyze patient specimens. One such analyzer is a tube characterization station (TCS) that analyzes tubes or sample containers and their contents. A TCS may back illuminate a sample container and capture an image of the sample container and its contents using a camera. The captured image is analyzed to provide information about the sample container and/or the contents therein. Some TCSs employ several cameras and backlights to capture images of sample containers and their contents from different angles or viewpoints. For example, a track may move sample containers to a fixed imaging location surrounded by several cameras that capture several images of the sample containers and/or their contents.

A TCS typically has a large footprint. For example, a TCS may include three cameras and three backlights surrounding an imaging location. In addition, the TCS may include a track or other device that transports sample containers into and out of the imaging location. When a TCS is incorporated into a large chemical test station, the aforementioned components may consume a large portion of the area of the chemical test station. In addition to the large footprint, it is difficult to keep stray light that may affect captured images of the sample containers and their contents out of the large area occupied by the TCS.

Accordingly, improved systems, apparatus, and methods for imaging sample containers and their contents are desired.

SUMMARY

In one aspect, a method of imaging a sample container and/or a specimen in a sample container is provided. The method includes enclosing at least a portion of a sample container with a moveable hood, the moveable hood having a wall with one or more openings extending between an interior of the moveable hood and an exterior of the moveable hood, and generating image data of the sample container using one or more imaging devices positioned exterior to the moveable hood, the one or more imaging devices having a line of sight to the sample container through the one or more openings.

In another aspect, an optical characterization apparatus is provided. The optical characterization apparatus includes a moveable hood having a closed state wherein the moveable hood is configured to at least partially enclose a sample container and an open state wherein the moveable hood is configured not to at least partially enclose a sample container; one or more openings extending between an interior of the moveable hood and an exterior of the moveable hood; and one or more optical devices located exterior to the moveable hood, the one or more optical devices being in a line of sight to the interior of the moveable hood when the moveable hood is in the closed state.

In another aspect, an automated specimen testing system is provided. The automated specimen testing system includes a track configured to move a sample container to an imaging location; a moveable hood having a closed state wherein the moveable hood is configured to at least partially enclose a space proximate the imaging location and an open state wherein the moveable hood is configured not to at least partially enclose a space proximate the imaging location; one or more openings extending between an exterior of the hood and an interior of the hood; and one or more optical devices located external to the hood, each of the one or more optical devices being in a light path through the one or more openings and to the imaging location.

Numerous other aspects are provided in accordance with these and other embodiments of the disclosure. Other features and aspects of embodiments of the disclosure will become more fully apparent from the following detailed description, the appended claims, and the accompanying drawings.

BRIEF DESCRIPTION OF THE FIGURES

The drawings, described below, are for illustrative purposes only and are not necessarily drawn to scale. The drawings are not intended to limit the scope of the disclosure in any way.

DETAILED DESCRIPTION

A wide variety of automated chemical analyzers are used to analyze specimens, such as in-patient specimens, for the presence of certain chemicals. Some chemical analyzers employ optical devices to measure optical properties of chemicals or specimens within sample containers. In some embodiments, light absorption properties of specimens and/ or sample containers may be measured by the optical devices (e.g., imaging devices) within chemical analyzers. In other embodiments, fluorescence and light scattering properties of specimens may be measured by the optical devices. In some embodiments, one or more light sources may illuminate specimens and optical detectors may measure the light absorption and light scatting properties of specimens resulting from the illumination. These measured optical properties may be analyzed to determine information regarding the content of chemical components of the specimens. The optical properties may also be used to analyze information about the sample containers, such as identifying cap color and reading barcode labels affixed to the sample containers.

Full 360 degree views of specimens and sample containers may be captured by two or more cameras capturing multiple viewpoints of the sample containers. Images of full 360 degree views of sample containers may offer many benefits over images captured by a single camera in a fixed location. For example, labels, such as barcode labels, may be on any side of sample containers and, regardless of their location, are readable by 360 degree images of the sample containers. In addition, labels may occlude parts of the specimens within the sample containers. This occluding would otherwise prevent specimens within the sample containers from being imaged. With the multiple viewpoints captured, specimens may be optically analyzed even though portions of the specimens are occluded by labels. For example, a portion of a specimen may be occluded from a first camera, but visible to a second camera.

Chemical analyzers that capture images of multiple viewpoints of sample containers require significant space and the placement of optical components may be limited by the structure of the chemical analyzers. These chemical analyzers may include conveyance mechanisms, such as tracks and/or robots that move sample containers into a field of view of all the cameras. Accordingly, the movement of sample containers has to clear several optical components implemented to capture the several views of the sample containers. In addition, the imaging location where the sample containers are imaged should have minimal stray or ambient light that may adversely affect the captured images.

In addition to the foregoing, illuminated backdrops may be associated with each camera and should match the size of vision cones at the respective distances between the cameras and the illuminated backdrops. The distances are constrained by the geometry of the imaging components, which too is restricted as described above. In some embodiments, unique-shaped illuminated backdrops are designed to fit into tightly constrained spaces, which may be costly.

As described above, the space proximate the imaging location may include the conveyance mechanisms, imaging devices, illuminated backdrops, and may also include light shields to block stray light from the imaging location. The high concentration of devices proximate the imaging location may prevent adequate light shields from being implemented proximate the imaging area. Accordingly, the measurements performed by chemical analyzers may be susceptible to the adverse effects of stray light.

The conveyance mechanisms may pass through the field of view of the cameras and may interfere with other optical devices, which limits the position and number of optical devices that may be implemented in the chemical analyzers. Some conveyance mechanisms may be located in the field of view of the cameras, which may limit the minimum viewing distances of the cameras.

Embodiments of the present disclosure concern providing improved optical characterization apparatus, systems, and methods for chemical analyzers. These and other aspects and features of the disclosure will be described with reference to FIGS. 1-7 herein.

Reference will now be made in detail to the example embodiments of this disclosure, which are illustrated in the accompanying drawings. Wherever possible, the same reference numbers will be used throughout the drawings to refer to the same or like parts throughout the several views. Features of the various embodiments described herein may be combined with each other, unless specifically noted otherwise.

Figure 1:
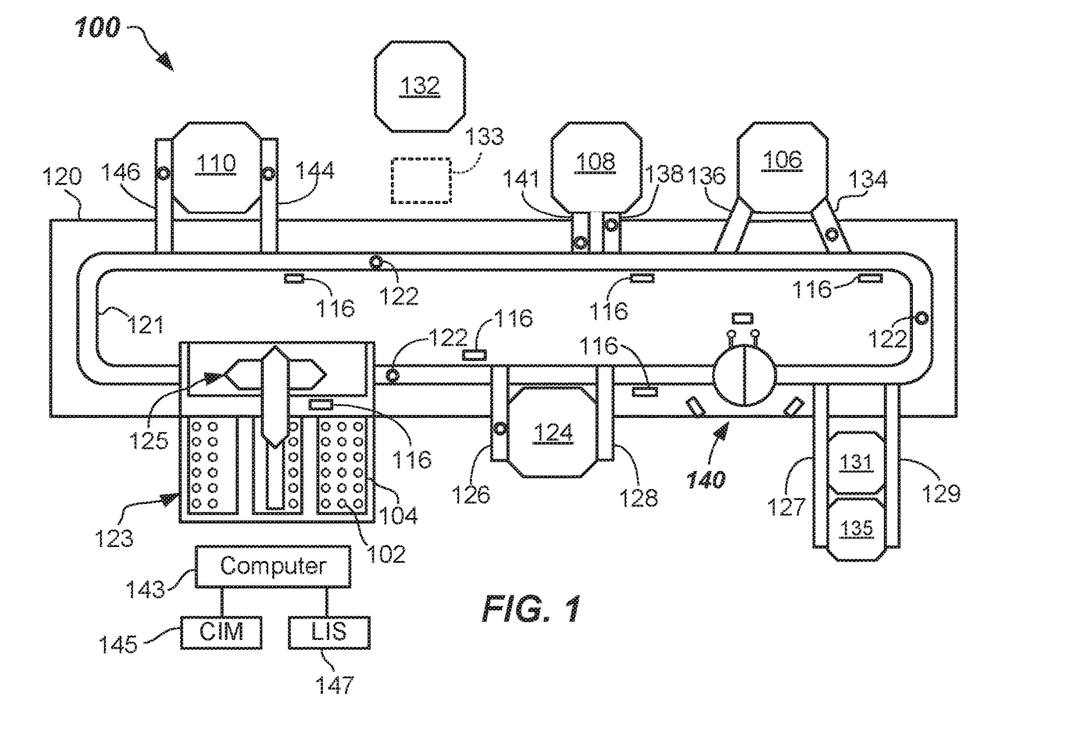
FIG. 1 illustrates a schematic top plan view of an automated specimen testing system including one or more pre-analytical optical characterization apparatus and one or more analyzers according to embodiments.
Figure 2:
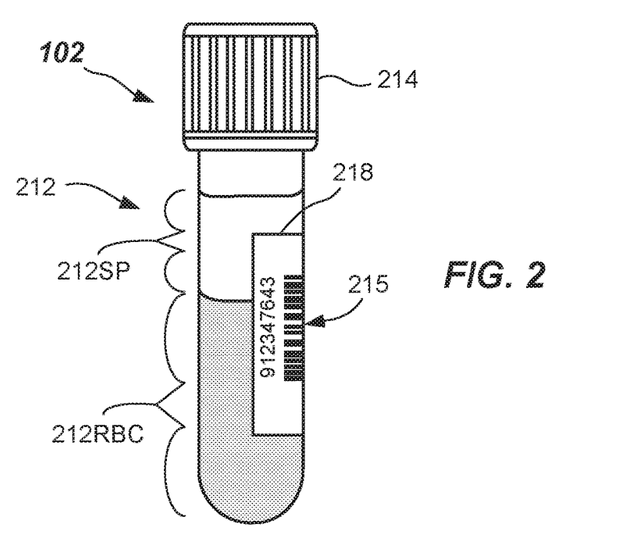
FIG. 2 illustrates a side view of a labeled sample container including a centrifuged specimen, which may be imaged by the optical characterization apparatus according to embodiments.

Reference is now made to FIGS. 1 and 2. FIG. 1 illustrates a top schematic view of an automated specimen testing system 100 configured to automatically pre-process multiple ones of sample containers 102 (e.g., test tubes, sample containers, or blood collection tubes—see FIG. 2). FIG. 2 illustrates a side view of a sample container 102 that has undergone centrifugation at centrifuge 124 to separate out a serum or plasma portion 212SP from a red blood cell portion 212RBC. Sample containers containing specimens other than blood may be used with the specimen testing system 100. The sample container 102 may be any generally clear or transparent container, such as a sample cup, cuvette, or other clear glass or plastic container.

The sample containers 102 may be contained in one or more sample racks 104 prior to analysis by one or more analyzers (e.g., analyzer 106, analyzer 108, and analyzer 110). Specimens 212 may be automatically processed and may be provided to the automated specimen testing system 100 in the sample containers 102, which may be capped with a cap 214. Each of the sample containers 102 may be provided with identification information 215, such as a bar code, alphabetic, numeric, or alphanumeric indicia, that may be machine readable by one or more sensors 116 (e.g., barcode readers). The identification information 215 may indicate a patient's identification as well as information concerning the tests or the assay procedures to be accomplished upon the specimen 212 therein, for example. The identification information 215 may be provided on a label 218 adhered to, or otherwise provided on the side of, the sample container 102. The label 218 may not extend all the way around the sample container 102, or all along a length of the sample container 102. Accordingly, although the label 218 may occlude some portion of the specimen 212, some portion of the specimen 212 may still be viewable. In some embodiments, the sample racks 104 may have additional identification information thereon.

Automated specimen testing system 100 may include a base 120 (e.g., a frame or other structure) upon which a conveyor track 121 (which may be a collection of conveyor belts, chains, platforms, or the like) or other suitable conveyance mechanism may be mounted. Conveyor track 121 may transport individual ones of the sample containers 102 that may be carried on the conveyor track 121 in sample container carriers 122 (e.g., single specimen carrier pucks or automated carriers including a liner motor). Sample container carriers 122 may leave from a sample container load/unload station 123 having the one or more sample racks 104. A robot 125 or the like may be configured to grasp the sample containers 102 from the sample racks 104 and load the sample containers 102 into the sample container carriers 122 on an input lane of the conveyor track 121. The robot 125 may be further configured to remove sample containers 102 from sample container carriers 122 on the conveyor track 121 upon completion of testing. Upon being loaded onto conveyor track 121, the sample containers 102 carried by sample container carriers 122 may progress to the centrifuge 124 (e.g., an automated centrifuge) and may be diverted to the centrifuge 124 by inflow lane 126 or a robot. After being centrifuged, the sample containers 102 may exit on outflow lane 128 or by the robot and continue on the conveyor track 121 to an optical characterization apparatus 140.

The optical characterization apparatus 140 may be configured to automatically perform a characterization on the sample containers 102 and specimens 212 contained in the sample containers 102. The characterization may include determining a presence of one or more interferents such as hemolysis, icterus, and/or lipemia (hereinafter "HIL") in the serum or plasma portions 212SP of the specimens 212. The characterization may further include determining the characteristics of the sample containers 102, such as height of the sample containers 102, presence and color of the cap 214, tilt of sample containers 102 in the sample container carriers 122, and other characteristics. Other characteristics of the specimen 212 and/or the sample container 102 may be determined by the optical characterization apparatus 140.

An image of the serum or plasma portion 212SP of a specimen 212 may be captured by the optical characterization apparatus 140 to determine whether one or more interferents, such as HIL, are present in the specimen 212. In some embodiments, the image of the serum or plasma portion 212SP may be analyzed by any suitable means to determine the type of HIL interferent that is present. For example, a presence of hemolysis, expressing as a reddish hue in the serum or plasma portion 212SP of the specimen 212 may be determined by any suitable optical imaging analysis. The analysis may further determine an interferent level, such as a hemolytic index. In some embodiments, if a hemolyzed specimen 212 is detected at the optical characterization apparatus 140, the specimen 212 may be sent on to an analytical instrument (e.g., a specialized clinical analyzer, such as a remote analyzer 132) where a precise level of hemolysis can be measured and characterized.

Analysis of the captured image of the specimen 212 may optionally or additionally be used to detect icterus in the serum or plasma portion 212SP of the specimen 212. An icterus interferent may arise, for example, from an excess of bilirubin, the result of decaying red blood cells being converted in the spleen into bilirubin. Levels of bilirubin above 2-3 mg/dl may appear visibly yellowish or brownish in color in the serum or plasma portion 212SP of specimen 212. These levels of bilirubin may, in particular, adversely affect enzyme-based immunoassays carried out on the analyzers (e.g., analyzers 106, 108, and/or 110).

The icterus detection method may be similar to that for detecting hemolysis. The method may commence with receiving a sample container 102 in the optical characterization apparatus 140 where one or more images of the specimen 212 is captured. An analysis of the one or more images may be performed to test for the presence of icterus in accordance with the methods described herein below. In some embodiments, the same image(s) that was captured for the hemolysis detection may be used for icterus detection. The analysis may further determine an interferent level, such as an icteric index.

According to another broad aspect, embodiments of the disclosure may optionally or additionally be directed to methods and apparatus used to detect lipemia in a specimen 212. A lipemia interferent may exhibit a whitish appearance in the serum or plasma portion 212SP of a specimen 212 and may arise from the presence of excess lipids in the blood. Lipid levels above about 50 mg/dl may interfere with antibody binding in immunoassay testing and may accordingly affect immunoassay results from the automated specimen testing system 100.

The lipemia detection method may be similar to that for detecting hemolysis and icterus. The method may include receiving a sample container 102 in the optical characterization apparatus 140. One or more images of the specimen 212 may be captured and an analysis of the captured image for the presence of lipemia may be performed. In some embodiments, the same image(s) that was captured for the hemolysis and icterus detections may be used for lipemia detection. The analysis may further determine an interferent level, such as a lipemic index.

Lipemia is a specific sample quality discoloration defect, which may be resolved with special processing before the specimen 212 is tested or analyzed on an analyzer (e.g., analyzer 106, 108, 110). If lipemia is detected, the sample container 102 may be transferred to a remediation station 131 for further processing to remove or reduce lipids. For example, the remediation station 131 may introduce a solvent or other material to reduce the amount of lipemia. Once this is complete, the specimen 212 can be properly analyzed by one or more of the analyzers (e.g., analyzer 106, 108, 110).

The above analyses may optionally determine an interferent level, such as an index (e.g., hemolytic index, icteric index, lipemic index). "Index" as used herein shall mean a grade given to a particular specimen 212 based upon the determined content of interferent present. The grading scale for observation may range from zero through four (0-4), wherein, zero represents substantially none of the respective interferent, while four represents significant presence of the interferent. Alternately, the scale could be 0-10, 0-20, A-F, or some other range.

In some embodiments, the automated specimen testing system 100 may be able to perform corrective actions without user interaction or additional processing on specimens 212 identified by the optical characterization apparatus 140 as having problems. For example, the routing of a sample container 102 containing a specimen 112 with an HIL interferent may be removed from the conveyor track 121, such as by being diverted to inflow 127 or by a suitable robot. One or more stations, such as remediation station 131 and/or remediation station 135 may perform additional processing on the specimen 212 as a prerequisite to analysis on one or more analyzers (e.g., analyzer 106, 108, 110). The sample container 102 may then return to the conveyor track 121 by way of outflow 129 or a robot.

If a specimen 212 is found by the optical characterization apparatus 140 to contain no interferents or is otherwise normal, the sample container 102 with the normal specimen 212 may continue on the conveyor track 121. The specimen may be analyzed in the one or more analyzers (e.g., analyzer 106, 108, and/or 110) before returning to the sample container load/unload station 123 for offloading. It should be understood that more or less than three analyzers may be linked by the conveyor track 121 but, for purposes of illustration, three are shown.

The centrifuge 124 and each analyzer 106, 108, 110 may be equipped with robotic mechanisms and/or inflow lanes (e.g., inflow lanes 126, 134, 138, 144) configured to remove sample container carriers 122 from the conveyor track 121. The centrifuge 124 and each analyzer 106, 108, 110 may also be equipped with and robotic mechanisms and/or outflow lanes (e.g., outflow lanes 128, 136, 141 and 146) configured to reenter sample container carriers 122 to the conveyor track 121.

Additionally, the remote analyzer 132 may be serviced by the automated specimen testing system 100 even though the remote analyzer 132 is not directly linked to the automated specimen testing system 100. For example, an independent robot 133 (shown dotted) may carry sample containers 102 containing specimens 212 to the remote analyzer 132 and return them after testing. In some embodiments, the sample containers 102 may be manually removed and returned. The remote analyzer 132 may test for a hemolysis level, for example. Other testing or processing may be accomplished on the remote analyzer 132.

The automated specimen testing system 100 may include the one or more sensors 116 at one or more locations. Sensors 116 may be used to detect the locations of sample containers 102 along the conveyor track 121 by reading the identification information 215 (FIG. 2) placed on the sample containers 102, or like information (not shown) on the sample container carriers 122. In some embodiments, a distinct RFID chip may be embedded in each sample container carrier 122 and a conventional RFID reader system may be employed in the tracking operation, for example. Other means for tracking the locations of sample container carriers 122 may be used, such as proximity sensors.

The load/unload station 123 may include a robot 125 including one or more robot arms or components capable of X and Z, Y or X, Y, and Z motion. The robot 125 may be equipped with a robotic end effector (e.g., clamping hands or fingers) adapted to pick up and place the sample containers 102 into and out of the sample container carriers 122 and the sample racks 104. However, any suitable type of robot 125 may be used.

Automated specimen testing system 100 may be controlled by a computer 143, such as a microprocessor-based central processing unit CPU, having memory and suitable conditioning electronics and drivers for the system components. Computer 143 may be housed as part of, or separate from, the base 120 of the automated specimen testing system 100. The computer 143 may operate to control movement of the sample container carriers 122 to and from the load/unload station 123, the centrifuge 124, optical characterization apparatus 140, and each analyzer 106, 108, 110 carrying out various types of testing (e.g., assay processing). The computer 143 may control the automated specimen testing system 100 according to software, firmware, and/or hardware commands or circuits.

Embodiments of the present disclosure may be implemented using a computer interface module (CIM) 145 that allows for a user to easily and quickly access a variety of control screens and status display screens (now shown). These control and display screens may describe some or all aspects of a plurality of interrelated automated devices (e.g., analyzers 106, 108, 110 within automated specimen testing system 100) used for sample preparation and analysis of specimens 212. The CIM 145 may employ a first display screen (not shown) that is directly linked to a plurality of additional display screens (not shown). The display screens may display information about the operational status of a plurality of interrelated automated devices as well as information describing the location of any specific sample container 102 as well as a status of tests to be performed on, or being performed on, a specimen 212. The CIM 145 is thus adapted to facilitate interactions between an operator and automated specimen testing system 100. The CIM 145 may include a visual touch screen adapted to display a menu including icons, scroll bars, boxes, and buttons through which the operator may interface with the automated specimen testing system 100. The menu may include a number of function buttons programmed to display functional aspects of the automated specimen testing system 100. The computer 143 may interface with a laboratory information system (LIS) 147 and may receive information concerning specimens 212, patient information, information on tests ordered, and the like from the LIS 147. Further, the computer 143 may report analysis results to the LIS 147.

FIG. 2 illustrates a side view of an embodiment of a sample container 102 that has undergone centrifugation at centrifuge 124 to separate out a serum or plasma portion 212SP from a red blood cell portion 212RBC. As shown, the label 218 may occlude some of the serum or plasma portion 212SP, so that visualization of the serum or plasma portion 212SP by conventional imaging is difficult. Embodiments disclosed herein account for this occluding without having to rotate the sample container 102. Thus, analysis for interferents in the specimen 212 may occur as the sample container 102 stops at the optical characterization apparatus 140 on the conveyor track 121.

Figure 3:
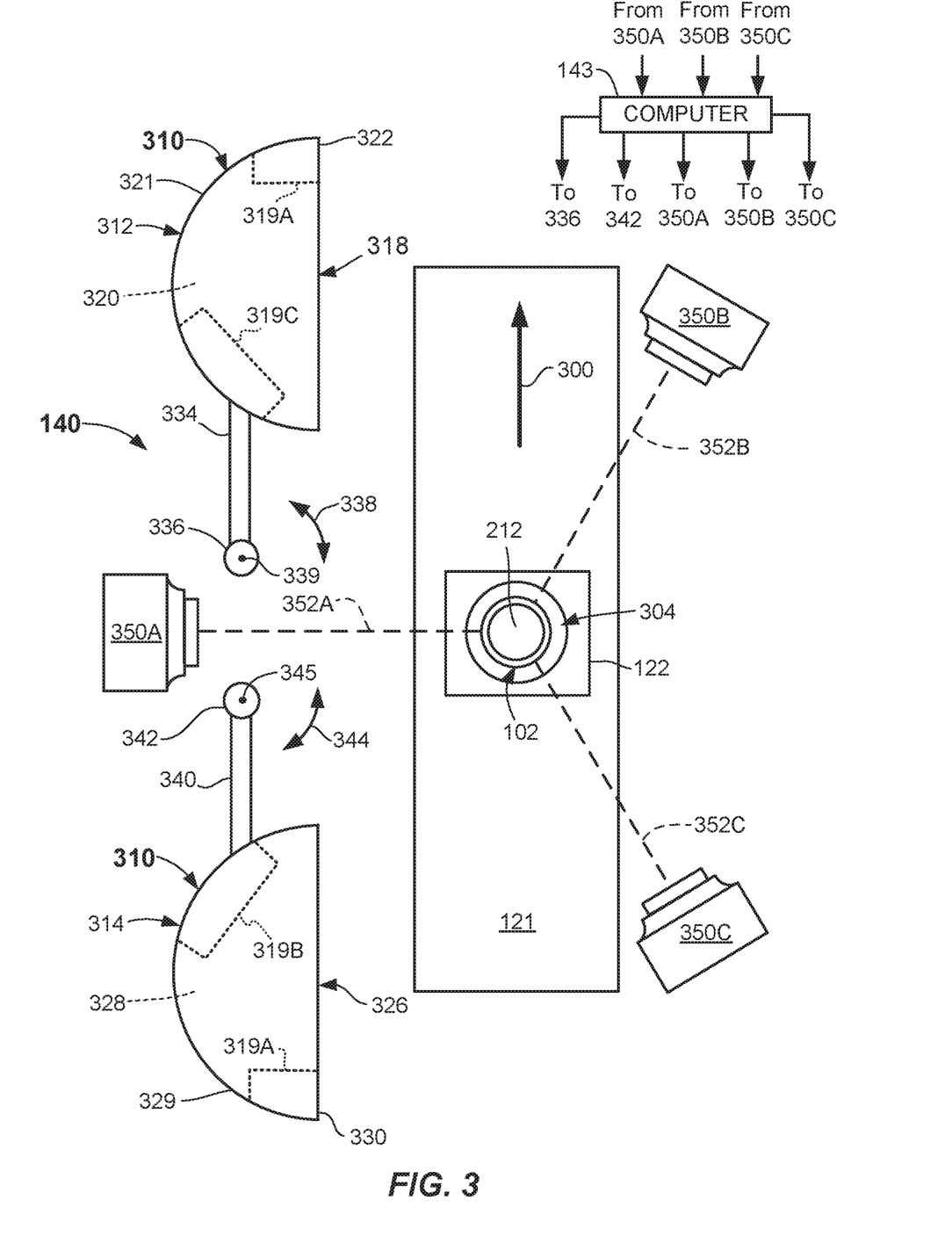
FIG. 3 illustrates a schematic top plan view of an optical characterization apparatus including a moveable hood shown in an open state according to embodiments.

Reference is now made to FIG. 3, which illustrates a top plan view of an embodiment of an optical characterization apparatus 140 shown in an open state. The optical characterization apparatus 140 may be located adjacent the conveyor track 121 so as to measure or analyze a specimen 212 and/or a sample container 102 holding the specimen 212. In some embodiments, the optical characterization apparatus 140 may read information, such as the label 218 (FIG. 2), located on the sample container 102 or optically-readable label on the sample container carrier 122. The sample container 102 may be located in the sample container carrier 122 and may travel on the conveyor track 121 (shown truncated) in a direction 300 relative to the optical characterization apparatus 140. Other embodiments may enable the sample container carrier 122 to travel in the direction 300 and/or an opposite direction. Other movement mechanisms may be implemented to move the sample container carrier 122 or the sample container 102, such as robotic arms and the like.

In the embodiment depicted in FIG. 3, the conveyor track 121 may move the sample container carrier 122 in the direction 300 to position the sample container 102 into and out of an imaging location 304 where optical measurements may be performed on the sample container 102 and/or the specimen 212 located therein. The imaging location 304 may be a location where all cameras and illumination devices described herein have light paths that are incident to the sample container 102 as described herein.

Analyzing a specimen 212 in a sample container 102 may include determining one or more characteristics of the specimen 212, such as the presence of one or more HIL interferents, overall height of the specimen 212, height of the red blood cell portion 212RBC, and/or height of the serum or plasma portion 212SP. The analyzing may include determining whether a separator is present between the red blood cell portion 212RBC and the serum or plasma portion 212SP and the thickness of the separator. The analyzing may further include determining physical characteristics of the sample container 102 containing the specimen 212, such as container height, container diameter, cap type, cap color, whether the sample container 102 contains a cap, or the like. Determining a characteristic of the sample container 102 may further include reading identification information 215 (e.g., a bar code) from the label 218 (FIG. 2) affixed to the sample container 102.

Illumination devices 319A-319C and related components that illuminate the sample container 102 and its contents may be located within a moveable hood 310 at suitable locations, such as opposed to imaging devices 350A-350C. The moveable hood 310 may be moveable to cover or at least partially enclose the sample container 102 and block stray light from the imaging location 304 while optical measurements are performed on the sample container 102 and/or images or the sample container 102 are captured. The embodiment of the moveable hood 310 depicted in FIG. 3 includes two hulls, a first hull 312 and a second hull 314, which may be constructed as mirror images of one another. The first hull 312 and the second hull 314 are depicted in FIG. 3 as being semicircular. Other hull shapes and configurations may be used in the optical characterization apparatus 140. The moveable hood 310 depicted in FIG. 3 is shown in an open state, meaning that the first hull 312 and the second hull 314 are separate and not enclosing or otherwise covering the imaging location 304. When the moveable hood 310 is in the open state, the optical characterization apparatus 140 is also referred to as being in an open state.

The first hull 312 may include a first opening 318 to a first cavity 320 at least partially surrounded by a first wall 321, which may be a vertical wall. A first surface 322 may at least partially surround the periphery of the first opening 318 to the first cavity 320. The second hull 314 may include a second opening 326 to a second cavity 328 at least partially surrounded by a second wall 329, which may be a vertical wall. A second surface 330 may at least partially surround the periphery of the second opening 326 to the second cavity 328. The first surface 322 and the second surface 330 may be configured so that they may match to each other to form a closed state of the moveable hood 310 as described herein. Stray light may be prevented from passing the interface of the first surface 322 and the second surface 330 when the moveable hood 310 is in the closed state. For example, a seal or other device (not shown) or configuration of the first surface 322 and the second surface 330 may prevent stray light from entering the moveable hood 310 when it is in a closed state. In some embodiments, portions of the interface may have slit-shaped openings for light paths between the sample container 102 and imaging devices 350A-350C positioned external to the moveable hood 310.

The first hull 312 may be coupled to a first arm 334, which may be coupled to a first actuator 336. The first actuator 336 may be a rotary actuator, such as a stepper motor or the like, that may pivot the first hull 312 along an arcuate path parallel to a first arcuate path 338 centered about a central axis 339 of the first actuator 336. Similarly, the second hull 314 may be coupled to a second arm 340, which may be coupled to a second actuator 342. The second actuator 342 may also be a rotary actuator, such as a stepper motor or the like, that may pivot the second hull 314 along an arcuate path parallel to a second arcuate path 344 centered about a central axis 345 of the second actuator 342. In some embodiments, one rotary actuator and suitable gears or belts may be used to drive the first hull 312 and second hull 314 along the first arcuate path 338 and second arcuate path 344, respectively. Other suitable mechanisms configured to cause the arcuate motion may be used, such as linear actuators pivotally coupled to the first arm 334 and second arm 340. The aforementioned devices for moving the first hull 312 and the second hull 314 may be configured to pivot the first hull 312 and the second hull ninety degrees between the open state and the closed state.

One or more imaging devices may be located exterior to the first cavity 320 and the second cavity 328. The embodiment depicted in FIG. 3 includes three imaging devices, a first imaging device 350A, a second imaging device 350B, and a third imaging device 350C. The imaging devices may be digital two-dimensional cameras, line cameras, telecentric cameras, barcode readers, photoelectric sensor arrays, CCD sensors, CMOS sensors, linear arrays of photodetectors, or any other device that converts light into image data. The imaging devices 350A-350C may be oriented such that each imaging device has a light path extending to the sample container 102 or the imaging location 304. The first imaging device 350A is in a first light path 352A, the second imaging device 350B is in a second light path 352B, and the third imaging device 350C is in a third light path 352C.

The computer 143 may control the operation of the electronic devices of the optical characterization apparatus 140. For example, the computer 143 may control operation of the first actuator 336 and the second actuator 342. In addition, the computer 143 may transmit instructions to the imaging devices 350A, 350B, 350C to capture images and generate and transmit image data. The computer 143 may further receive and/or process image data generated by the imaging devices 350A, 350B, 350C.

Figure 4:
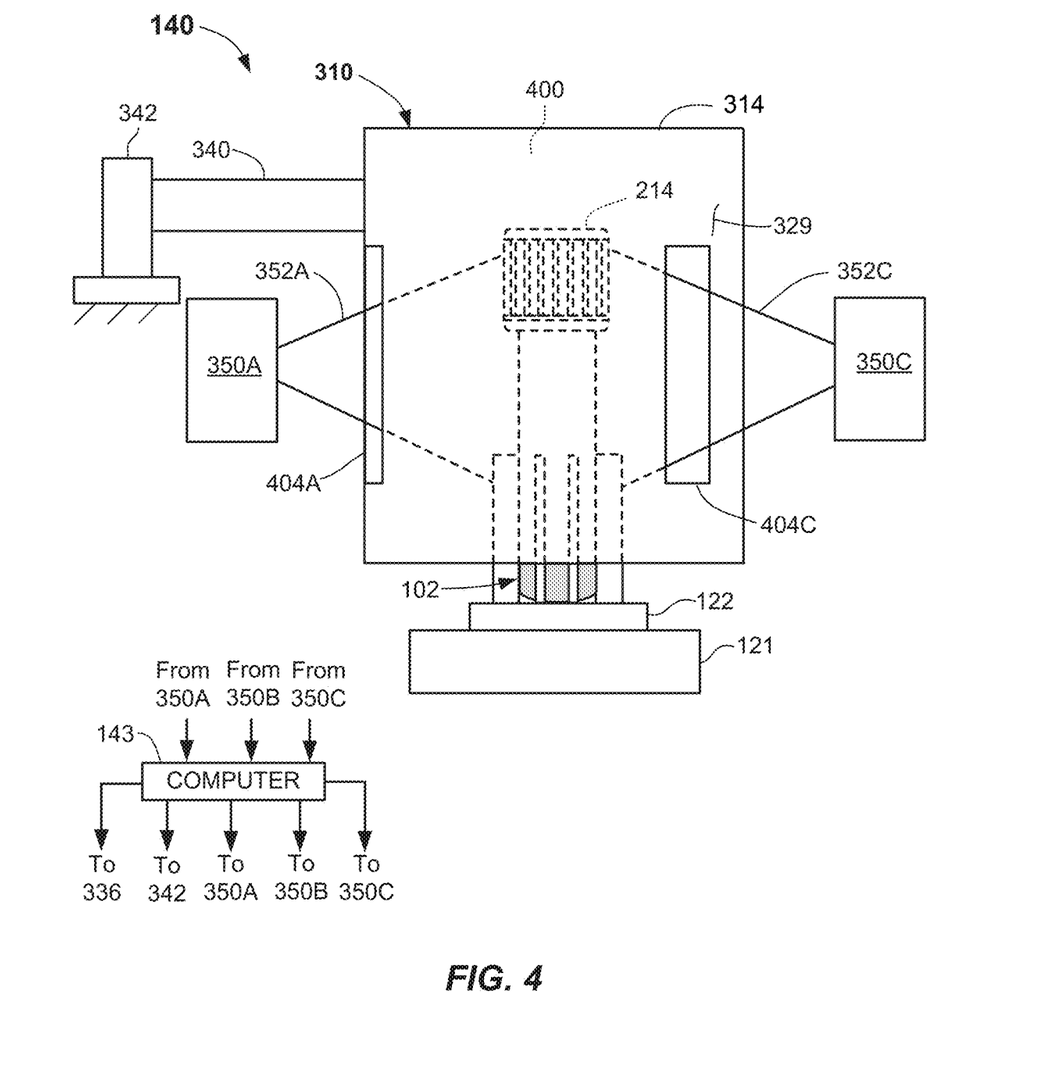
FIG. 4 illustrates a side elevation view of an optical characterization apparatus including a moveable hood shown in a closed state according to embodiments.

Reference is now made to FIG. 4, which illustrates an embodiment of a side elevation view of the moveable hood 310 in a closed state. The closed state may further refer to the optical characterization apparatus 140 being in a closed state. The closed state of the moveable hood 310 may be achieved by the first actuator 336 (FIG. 3) rotating in a first direction (e.g., clockwise) and the second actuator 342 rotating in a second direction (e.g., counter-clockwise) to bring the first hull 312 (FIG. 3) and the second hull 314 together and preferably in contact with each other over the sample container 102. The first cavity 320 (FIG. 3) and the second cavity 328 (FIG. 3) combine when the moveable hood 310 is in the closed state to form an enclosure 400, which constitutes the interior of the moveable hood 310.

The first wall 321 (FIG. 3) and the second wall 329 include one or more openings (e.g., slit openings 404A-404C) extending between the enclosure 400 and the exterior of the moveable hood 310. The slit openings 404A-404C enable the imaging devices located exterior to the moveable hood 310 to capture images of the sample container 102 and/or a sample container carrier 122 within the enclosure 400. The embodiment of the second wall 329 depicted in FIG. 4 includes two slit openings 404A and 404C. The slit opening 400A 404A is sized and configured to pass the first light path 352A and the slit opening 404C is sized and configured to pass the third light path 352C. The first light path 352A and the third light path 352C are depicted as being fan-shaped or rectangular in the view of FIG. 4, having a height that is longer than a width. Such light paths may be used with imaging devices 350A and 350C being line cameras or two-dimensional cameras (e.g., digital cameras or other imaging devices). In some embodiments, the slit openings 404A, 404C may be filled with a material, such as clear plastic or glass, which is optically transparent to light.

The first wall 321 (FIG. 3) and the second wall 329 may, in some embodiments, extend closer to the conveyor track 121 or further from the conveyor track 121 than shown herein. In some embodiments, the first wall 321 and/or the second wall 329 may include flexible materials (e.g. fabrics) extending to or proximate the conveyor track 121 to further prevent light from entering the enclosure 400.

The first hull 312 and the second hull 314 have been described above as moving in arcuate paths between the open state and the closed state. In other embodiments, the first hull 312 and the second hull 314 may move in other directions. For example, the first hull 312 may be located on a first side of the conveyor track 121 and the second hull 314 may be located on a second side of the conveyor track 121 so the first cavity 320 and the second cavity 328 face each other. The first hull 312 and/or the second hull 314 may move linearly relative to each other so the first surface 322 and the second surface 330 contact in the closed state.

Figure 5:
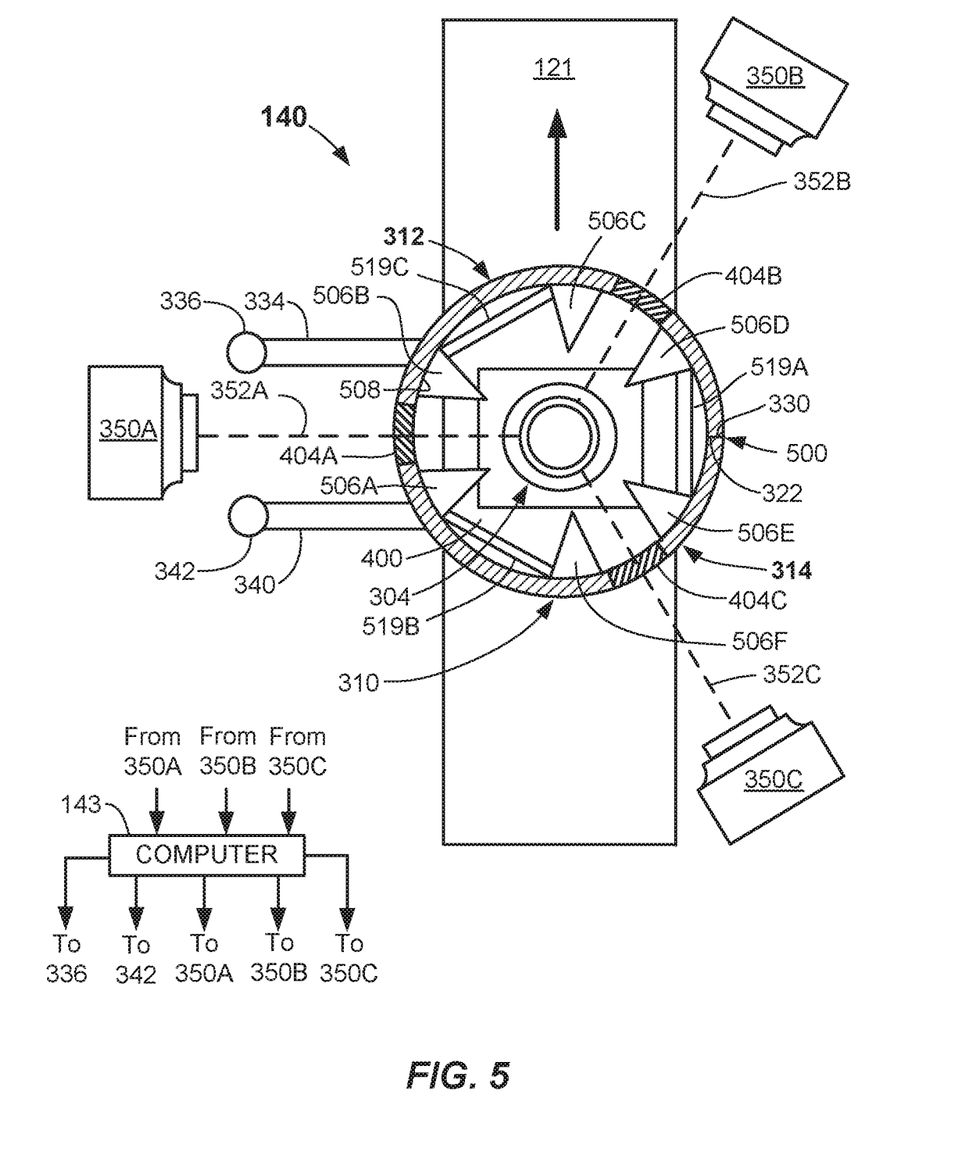
FIG. 5 illustrates a schematic top plan view of an optical characterization apparatus showing a partial cross-sectional view of a moveable hood shown in a closed state according to embodiments.

Reference is now made to FIG. 5, which illustrates a top schematic view of an embodiment of the optical characterization apparatus 140 illustrating a cross-sectional view of the moveable hood 310. The first surface 322 of the first hull 312 may be matched to the second surface 330 of the second hull 314 to create an interface 500 between the first surface 322 and the second surface 330 when the moveable hood 310 is in the closed state. The interface 500 between the first surface 322 and the second surface 330 may prevent stray and/or ambient light from entering the enclosure 400 and adversely affecting images captured by the imaging devices 350A-350C.

The moveable hood 310 may include one or more light shields 506A-506F extending from an inner surface 508 of the moveable hood 310. The light shields 506A-506F are devices that block and/or deflect light and may be made of materials such as plastic and metal that are opaque and do not appreciably transmit light. The light shields 506A-506F may be of a dark color, such as black. Illumination devices 519A-519C (e.g., light emitting devices) may be located on opposite sides of the slit openings 404A, 404B, 404C. Each of the illumination devices 519A-519C may be adjacent to and spaced between two of the light shields 506A-506F. The embodiment of the moveable hood 310 depicted in FIG. 5 includes a first illumination device 519A located opposite the first slit opening 404A and in the first light path 352A. A light shield 506A and a light shield 506B are located on either side of the first slit opening 404A. The light shield 506A and the light shield 506B minimize extraneous or stray light from being imaged by the first imaging device 350A. For example, the light shield 506A and the light shield 506B may prevent extraneous light from interfering with the first light path 352A, so that the intensity of images of the sample container 102 and specimen 212 captured by the first imaging device 350A is relatively unaffected by stray light.

The first illumination device 519A may be located opposite the first slit opening 404A and may be adjacent the light shield 506D and the light shield 506E. The illumination devices 519A-519C may emit light having a predetermined intensity and/or nominal wavelength spectra. For example, the illumination devices 519A-519C may be electrically coupled to the computer 143, which transmits instructions to the illumination devices 519A-519C regarding intensity and wavelength of light emitted by the illumination devices 519A-519C. The light shield 506D and the light shield 506E may prevent stray light emitted by the first illumination device 519A from adversely affecting images captured by the second imaging device 350B and the third imaging device 350C.

The second slit opening 404B may be located in the second light path 352B and opposite the second illumination device 519B. The second slit opening 404B may be adjacent the light shield 506C and light shield 506D. The second illumination device 519B may be adjacent the light shield 506A and the light shield 506F. The light shield 506A and the light shield 506F may prevent light emitted by the second illumination device 519B from straying to the first slit opening 404A and/or the third slit opening 404C. The light shield 506C and the light shield 506D may prevent light generated from sources other than the second illumination device 519B from appreciably affecting the intensity of images captured by the second imaging device 350B.

The third slit opening 404C may be located in the third light path 352C and opposite the third illumination device 519C. The third slit opening 404C may be adjacent the light shield 506E and the light shield 506F. The third illumination device 519C may be adjacent the light shield 506B and the light shield 506C. Light shield 506B and the light shield 506C may prevent light emitted by the third illumination device 519C from straying to the first slit opening 404A and/or the second slit opening 404B. The light shield 506E and the light shield 506F may prevent light generated by sources other than the third illumination device 519C from appreciably affecting the intensity of the images captured by the third imaging device 350C.

The illumination devices 519A-519C may be any suitable devices capable of providing suitable intensity of illumination for imaging. In some embodiments, the illumination devices 519A-519C may comprise one or more colored light sources, such as red (R), green (G) and blue (B) light sources, such as RGB light emitting diodes (LEDs) or lasers. Optionally, the illumination devices 519A-519C may comprise white light (WL) sources and/or infrared (IR) or near IR sources. The illumination devices 519A-519C may comprise light panels including combinations of R, G, B, WL, IR, and/or near IR sources. Accordingly the illumination devices 519A-519C may emit various predetermined spectra or wavelengths of light.

In some embodiments, the illumination devices 519A-519C may include devices that emit changeable illumination patterns. The devices may be implemented using an LCD mask, a two-dimensional array of light sources, thin-film transistors (TFT), or light sources. The devices may be controlled by the computer 143 to implement multiple illumination configurations, which enhances the information content available for further processing. For example, the intensity and/or wavelength of light emitted by the illumination devices 519A-519C may be controlled and changed dynamically.

Figure 6A:
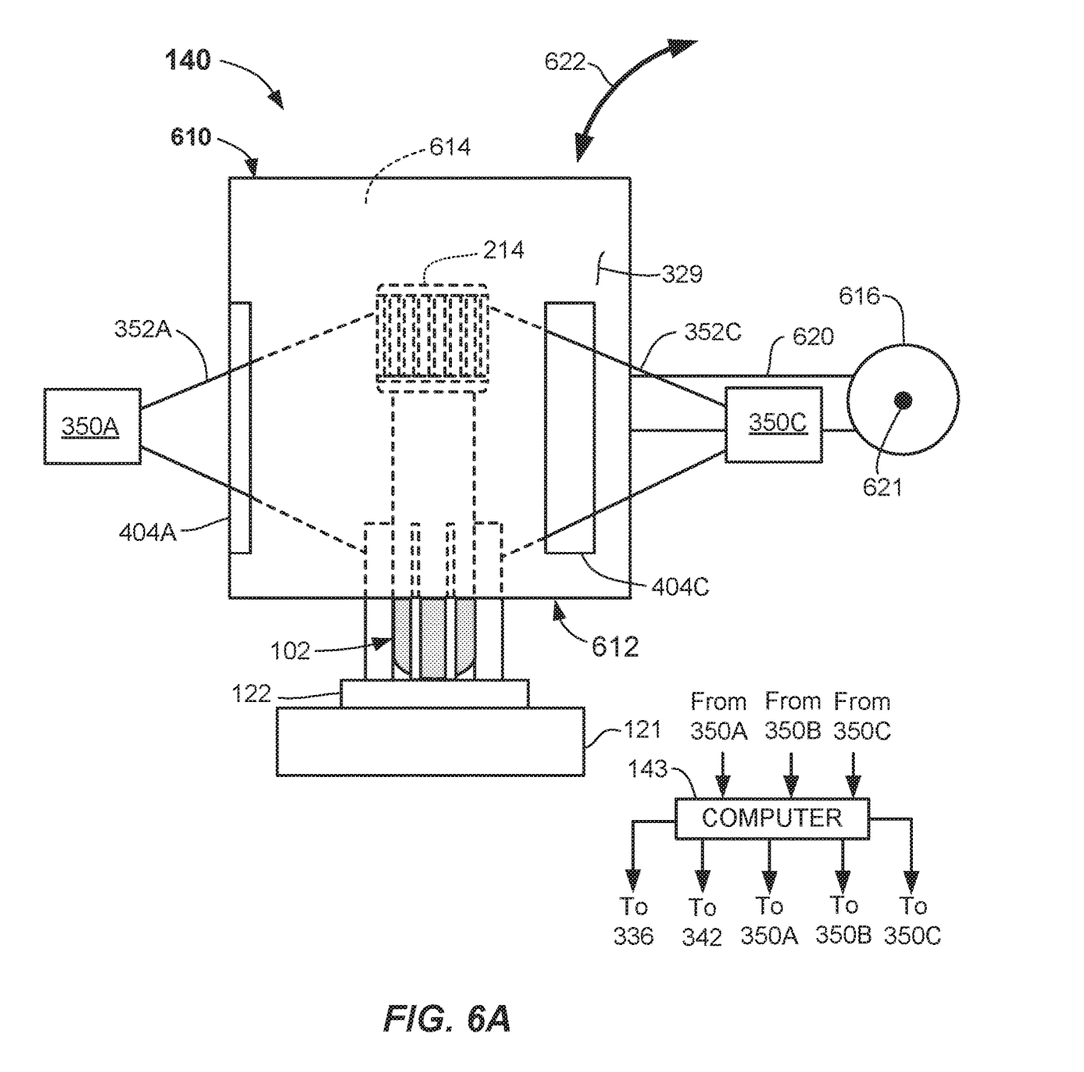
FIG. 6A illustrates a side elevation view of an optical characterization apparatus including a one-piece moveable hood shown in a closed state according to embodiments.
Figure 6B:
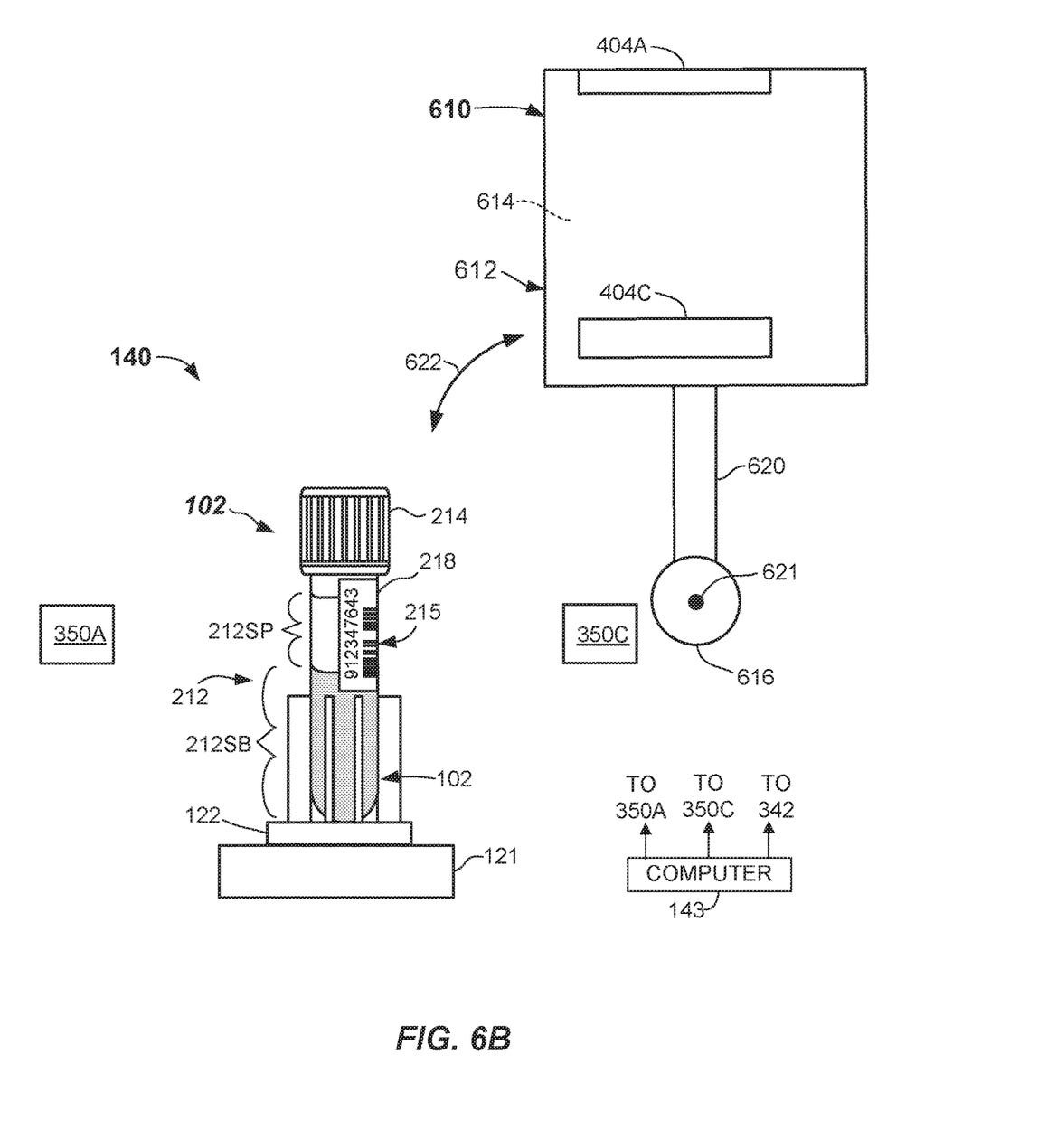
FIG. 6B illustrates the apparatus of FIG. 6A with the one-piece moveable hood shown in an open state according to embodiments.

FIG. 6A illustrates another embodiment of the optical characterization apparatus 140 including, in this embodiment, a single-piece hood 610 shown in a closed state. FIG. 6B illustrates an embodiment of optical characterization apparatus 140 including the single-piece hood 610 shown in an open state. The single-piece hood 610 may include an opening 612 that opens to an enclosure 614. The opening 612 is sized and configured to set over a sample container 102 so that at least a portion of the sample container 102 is located within the enclosure 614 when the single-piece hood 610 is in the closed state. The opening 612 may further be sized and configured to set over a sample container carrier 122 so that at least a portion of the sample container carrier 122 is located within the enclosure 614 when the single-piece hood 610 is in the closed state. The single-piece hood 610 may extend close to the conveyor track 121 when it is in the closed state to further prevent ambient or stray light from entering the enclosure 614. In other embodiments, the single-piece hood may have materials (e.g., fabrics) extending from the enclosure toward the conveyor track 121 when the single-piece hood 610 is in the closed state to further prevent light from entering the enclosure 614.

The single-piece hood 610 may transition between the open state and the closed state by movement of an actuator 616 coupled to the single-piece hood 610 by an arm 620. In some embodiments, the actuator 616 may pivot the single-piece hood 610 ninety degrees about an axis 621 centered in the actuator 616. The actuator 616 may be mechanically coupled to a structure, such as the base 120 (FIG. 1). Actuator 616 may be a rotary actuator such as a stepper motor or any other actuator, gear, belt, or linkage mechanism that enables effective rotation of the single-piece hood 610. The computer 143 may transmit signals to the actuator 616 causing the actuator 616 to rotate along a path parallel to arc 622. This rotation of the actuator 616 causes the single-piece hood 610 to transition between the open state and the closed state along an arcuate path of the arc 622. Other devices may move the single-piece hood 610 between the open state and the closed state in other than an arcuate path. For example, other actuators and/or mechanisms may move the single-piece hood 610 vertically between the open state and the closed state.

The single-piece hood 610 may normally be in the open state depicted in FIG. 6B. A sample container carrier 122 may move on the conveyor track 121 to the imaging location 304 (FIG. 3). The sample container carrier 122 may stop in the imaging location 304 while the single-piece hood 610 transitions from the open state of FIG. 6B to the closed state of FIG. 6A to at least partially enclose the sample container 102. When the single-piece hood 610 is positioned in the closed state, imaging of the sample container 102 and/or the specimen 212 proceeds as described above. Upon completion of the imaging, the actuator 616 may transition the single-piece hood 610 to the open state and the sample container carrier 122 may proceed to other locations within the automated specimen testing system 100 (FIG. 1).

The single-piece hood 610 has been described above as moving along an arc 622 to transition between the open state and the closed state. In other embodiments, the single-piece hood 610 may move vertically between the open state and the closed state. In other embodiments, the single-piece hood 610 may move vertically away from the conveyor track 121 and transition to a side when moving between the closed state and the open state. Opposite movement may move the single-piece hood 610 between the open state and the closed state.

Detailed operation of the optical characterization apparatus 140 is described below with reference to the moveable hood 310 of FIG. 3. The following description is also applicable to the single-piece hood 610 of FIG. 6A. During operation of the optical characterization apparatus 140, the moveable hood 310 may be in an open state as shown in FIG. 3. A sample container carrier 122 carrying a sample container 102 may be moved along the conveyor track 121 until it reaches the imaging location 304 or is otherwise provided at the imaging location 304. When the sample container carrier 122 is located at the imaging location 304, the computer 143 may transmit instructions to the first actuator 336 and the second actuator 342 causing them to move the first hull 312 and the second hull 314 together. The first hull 312 and the second hull 314 may meet over the imaging location 304 to form the enclosure 400 (FIG. 4). At this point, the enclosure comprises a closed space and the sample container 102 may be at least partially isolated from stray light sources.

The computer 143 may instruct the illuminating devices 519A-519C and the imaging devices 350A-350C to generate image data based on specific screening tests that are to be performed on the specimen 212 within the sample container 102. The computer 143 may instruct the illumination devices 519A-519C to emit specific intensities of light at specific wavelengths. The light emitted by the illumination devices 519A-519C passes through the sample container 102 and interacts with the specimen 212 within the sample container 102. Light passing through the specimen 212 may scatter or be absorbed depending on the wavelength of the light and the properties of the specimen 212. One or more of the imaging devices 350A-350C may capture images of the illuminated specimen 212 and transmit the image data to the computer 143 for processing. In some embodiments, images are captured from all the imaging devices 350A-350C so that the occluding effects of the label 218 may be minimized.

The image data generated by the imaging devices 350A-350C may include images of the sample container 102 and specimen 212. The image data of the sample container 102 may include information such as the height and/or width of the sample container 102 enabling the type of container to be identified. The image data of the specimen 212 may include information such as the height and/or width of the specimen 212 in addition to the height and/or width of the serum or plasma portion 212SP (FIG. 2) and the red blood cell portion 212RBC. The image data of the specimen 212 may include information such as the transmittance through the specimen 212 at various locations along the length and/or width. The image data may further include images of the top of the sample container 102, which may be analyzed to determine if a cap 214 (FIG. 2) is on the sample container 102 and identification of the cap 214, such as the color of the cap 214. Labels affixed to the sample container 102 may also be identified and read by the imaging devices 350A-350C. For example, bar codes or other indicia printed on a label 218 may be read by the imaging devices 350A-350C and analyzed by the computer 143.

The optical characterization apparatus 140 provides many benefits for imaging the sample containers 102 and specimens 212 located therein. The moveable hood 310 provides a light shield to block unwanted stray or ambient light from illuminating the sample container 102. The moveable hood 310 is moveable, so permanent light-blocking structures are not required to be located above or otherwise adjacent the conveyor track 121. Thus, the optical characterization apparatus 140 does not have to be configured to have light shields located thereon that the sample containers 102 have to move around during travel on the conveyor track 121.

Imaging performed by the imaging devices 350A-350C may be very accurate. For example, the moveable hood 310 and the light shields 506A-506F prevent stray and/or ambient light from illuminating the sample container 102 and the specimen 212 located therein. The result is that a majority of illumination is provided by the illumination devices 519A-519C, which may emit predetermined wavelengths of light at predetermined intensities.

The moveable hood 310 enables one or more imaging devices 350A-350C to generate image data of the sample container 102 and the specimen 212 at different viewing angles. The result is that 360 degree imaging or imaging close to 360 degrees may be achieved. This imaging enables identification indicia to be read regardless of its orientation. Furthermore, specimens 212 may be imaged regardless of whether a label 218 would otherwise block some viewpoints.

Figure 7:
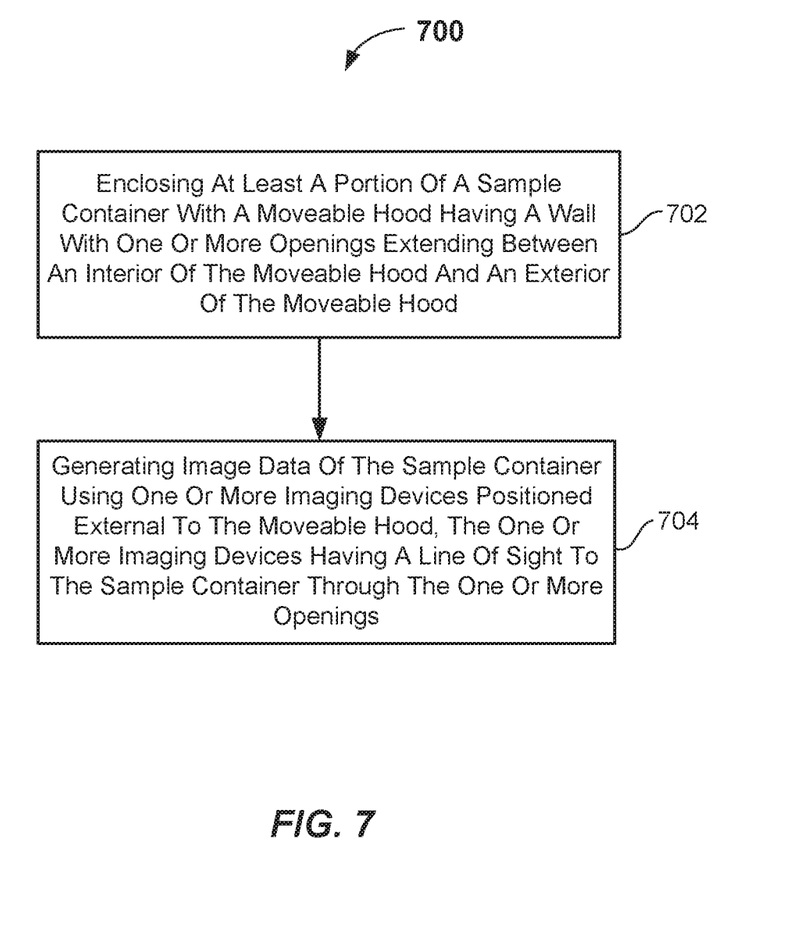
FIG. 7 illustrates a flowchart of a method of imaging a sample container and/or a specimen in a sample container according to embodiments.

FIG. 7 illustrates a flowchart of a method 700 of imaging a sample container (e.g., sample container 102) and/or a specimen (e.g., specimen 212) contained in the sample container. The method 700 may include, in 702, enclosing at least a portion of a sample container with a moveable hood (e.g., the moveable hood 310 or the single-piece hood 610). The moveable hood may have a wall (e.g., first wall 321 and the second wall 329) with one or more openings (e.g., slit openings 404A-404C) extending between an interior of the moveable hood and an exterior of the moveable hood. The method may include, in 704, generating image data of the sample container using one or more imaging devices (e.g. one or more of imaging devices 350A-350C) positioned external to the moveable hood. The one or more imaging devices may have a line of sight to the sample container through the one or more openings.

The foregoing description discloses only example embodiments of the disclosure. Modifications of the above-disclosed apparatus, systems and methods which fall within the scope of the disclosure will be readily apparent to those of ordinary skill in the art. Accordingly, while the present disclosure has been disclosed in connection with example embodiments, it should be understood that other embodiments may fall within the scope of the disclosure, as defined by the claims.

What is claimed is:

1. A method of imaging a sample container and/or a specimen in the sample container, comprising:
    moving the sample container via a conveyor track to an imaging location, the conveyor track extending through and beyond the imaging location;
    moving a movable hood into a closed state in which the movable hood encloses or covers a top and at least a portion of vertical sides of the sample container with a wall of the moveable hood at the imaging location, the movable hood positioned over the conveyor track while in the closed state, the wall having one or more openings extending between an interior of the moveable hood and an exterior of the moveable hood, the movable hood movable into an open state wherein the imaging location is not vertically enclosed or otherwise covered; and
    generating image data of the sample container using one or more imaging devices positioned external to the moveable hood, the one or more imaging devices having a line of sight to the sample container through the one or more openings.

2. The method of claim 1, wherein the moving of the moveable hood comprises matching a first hull of the moveable hood to a second hull of the moveable hood.

3. The method of claim 2, wherein the matching of the first hull of the moveable hood to the second hull of the moveable hood comprises moving the first hull to a position proximate the sample container and moving the second hull to a position proximate the sample container, wherein the first hull and the second hull contact.

4. The method of claim 2, wherein the matching of the first hull of the moveable hood to the second hull of the moveable hood comprises moving the first hull along an arcuate path in a first direction and moving the second hull along an arcuate path in a second direction, the second direction being opposite the first direction.

5. The method of claim 1, wherein the moveable hood comprises a single-piece hood.

6. The method of claim 5, wherein the moving of the single-piece hood is along an arcuate path.

7. The method of claim 1, wherein the generating of image data comprises generating image data of the specimen within the sample container.

8. The method of claim 1, further comprising illuminating the sample container with one or more illumination devices located in the interior of the moveable hood.

9. The method of claim 1, further comprising illuminating the sample container with one or more illumination devices and changing wavelengths of light emitted by the one or more illumination devices.

10. The method of claim 1, further comprising illuminating the sample container with one or more illumination devices and changing intensities of light emitted by the one or more illumination devices.

11. The method of claim 1, further comprising illuminating the sample container with one or more illumination devices, each of the one or more illumination devices generating a light path between the one or more illumination devices and the one or more imaging devices and extending through the sample container.

\* \* \* \* \*